United States Patent
Wright

(10) Patent No.: US 8,054,062 B2
(45) Date of Patent: Nov. 8, 2011

(54) METHOD AND APPARATUS FOR AMPLIFIED VARIABLE RELUCTANCE SPEED SENSOR

(75) Inventor: Scott Brian Wright, Ponte Vedra Beach, FL (US)

(73) Assignee: General Electric Company, Schenectady, NY (US)

(*) Notice: Subject to any disclaimer, the term of this patent is extended or adjusted under 35 U.S.C. 154(b) by 430 days.

(21) Appl. No.: 12/342,942

(22) Filed: Dec. 23, 2008

(65) Prior Publication Data

US 2010/0156395 A1 Jun. 24, 2010

(51) Int. Cl.
*G01P 3/46* (2006.01)
*G01B 7/30* (2006.01)

(52) U.S. Cl. .............. 324/174; 324/173; 324/207.25; 324/207.22

(58) Field of Classification Search .......... 324/173, 324/174, 207.22, 207.25
See application file for complete search history.

(56) References Cited

U.S. PATENT DOCUMENTS

| 5,012,171 | A | 4/1991 | Sember |
| 5,589,752 | A | 12/1996 | Iwasaki et al. |
| 6,078,161 | A | 6/2000 | Kim et al. |
| 6,107,772 | A | 8/2000 | Liu et al. |
| 6,653,811 | B2 | 11/2003 | Branecky |
| 7,049,859 | B2 | 5/2006 | Boyer et al. |
| 7,411,388 | B2 | 8/2008 | Sagoo et al. |
| 2003/0176932 | A1 | 9/2003 | Wild |
| 2003/0184282 | A1 | 10/2003 | Wild |
| 2007/0046126 | A1 | 3/2007 | Sagoo et al. |
| 2010/0060264 | A1* | 3/2010 | Smith .................. 324/202 |

* cited by examiner

*Primary Examiner* — Reena Aurora
(74) *Attorney, Agent, or Firm* — David J. Clement, Esq.; Armstrong Teasdale LLP

(57) ABSTRACT

A method and system for measuring a characteristic of a machine is provided. The system includes a speed sensor including a housing, a variable reluctance sensor (VRS) mounted at least partially within the housing, and a digitization circuit electrically coupled to an output of the VRS. The digitization circuit is also mounted within the housing and is configured to convert a substantially sinusoidal output of the VRS into a digital output signal.

18 Claims, 3 Drawing Sheets

METHOD AND APPARATUS FOR AMPLIFIED VARIABLE RELUCTANCE SPEED SENSOR

BACKGROUND OF THE INVENTION

The field of the invention relates generally to variable reluctance speed sensors, and more specifically, to signal conditioning of variable reluctance speed sensor output signals.

At least some known variable reluctance sensors include wire wrapped around a permanent magnet and are configured to sense a steel target that is part of a rotating assembly. For example, in an industrial application, the steel target may be coupled to, and rotate with, a rotor of a generator. As the steel target passes the variable reluctance sensor, a magnetic field produced by the sensor is disrupted, producing a sinusoidal voltage signal. Variable reluctance speed sensors are self-powered devices that provide an approximately 0.7 Volt peak-to-peak output at relatively low engine speeds and an approximately 50 Volt peak-to-peak output at relatively high speeds. The low output voltage signals generated at low engine speeds are difficult to accurately measure by the engine control circuitry and often require extensive filtering and signal amplification stages. The frequency and amplitude of the sinusoidal voltage signal are proportional to the speed of the rotor. The amplitude of the sinusoidal voltage signal output by the sensor is also dependent upon the distance between the sensor and the steel target. Because variable reluctance sensors do not require external power to generate an output signal, they are also referred to as "passive" magnetic sensors. The sensor output is provided to remote signal-processing circuitry for analysis. The signal-processing circuitry is positioned remotely from the sensor due to high temperatures and/or other harsh environmental conditions present at the position of the sensor. Due in part to the remote positioning of the signal-processing circuitry, if the circuitry is configured to analyze sensor output from a high speed rotor, the sensor may not produce an output signal with an adequate amplitude for signal-processing when the rotor is rotating at a low speed. However, incorporating signal conditioning circuitry within the speed sensor is problematic for two reasons, the high temperature environment (180° C.+) does not permit the use of cost effective integrated circuits, and employing electronics within sensors typically increases the number of wires and weight required to implement the interconnecting speed sensor and engine control harness.

BRIEF DESCRIPTION OF THE INVENTION

In one embodiment, a speed sensor includes a housing, a variable reluctance sensor (VRS) mounted at least partially within the housing, and a digitization circuit electrically coupled to an output of the VRS. The digitization circuit is also mounted within the housing and is configured to convert a substantially sinusoidal output of the VRS into a digital output signal.

In another embodiment, a method of measuring a characteristic of a machine includes generating an output signal from a variable reluctance sensing element portion of a sensor, the output signal having a variable amplitude and frequency representative of the characteristic, digitizing the output signal using a digitization circuit portion of the sensor such that the amplitude of the digitized signal is substantially constant over variations in the characteristic, and outputting a digitized output signal having a frequency proportional to the characteristic.

In yet another embodiment, a speed control system includes a speed sensor, a power supply positioned remotely from the speed sensor, and a controller configured to receive a digital output of the speed sensor. The speed sensor includes a variable reluctance sensing element electrically coupled to an externally powered digitization circuit. The variable reluctance sensing element and the digitization circuit are located in a single housing. The power supply is positioned remotely from the speed sensor and is electrically coupled to the speed sensor through a two-wire connection. The power supply is configured to supply a regulated voltage to the digitization circuit, and the controller is configured to generate speed control commands using the received digital output.

BRIEF DESCRIPTION OF THE DRAWINGS

FIG. 1 is a schematic block diagram of a rotatable machine controlled by a speed control system in accordance with an exemplary embodiment of the present invention;

FIG. 2 is a schematic diagram of speed sensor in accordance with an exemplary embodiment of the present invention; and FIG. 3 is a flow diagram of a method of measuring a characteristic of a machine in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of remote sensing and signal conditioning in industrial, commercial, and residential applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
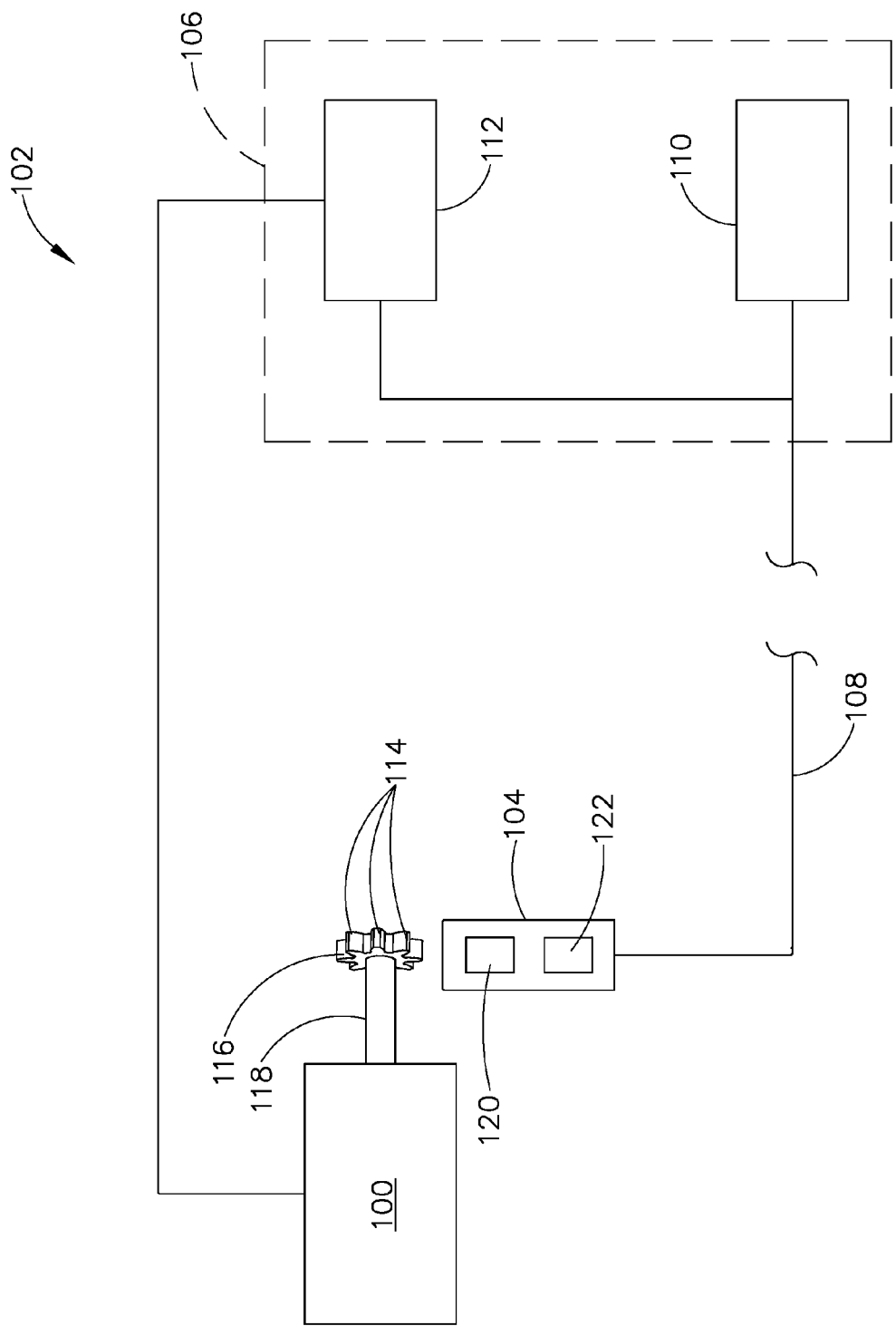
FIGS. 1-3 show exemplary embodiments of the method and system described herein.

FIG. 1 is a schematic block diagram of a rotatable machine 100 controlled by a speed control system 102 in accordance with an exemplary embodiment of the present invention. In the exemplary embodiment, speed control system 102 includes a speed sensor 104 electrically coupled to a machine control system 106 through a conduit 108, for example, a two-wire signal connection. In the exemplary embodiment, machine control system 106 includes a sensor power supply 110 and a speed controller 112. Although illustrated with reference to a rotatable machine, speed control system 102 and/or speed sensor 104 may be used with linear motion machines or other non-rotating machines. The circuit approach illustrated in FIG. 1 employs cost effective high temperature circuitry to digitize an output of speed sensor 104 through a 2 wire interface between speed sensor 104 and machine control system 106, and reduces the filtering and amplification circuitry required in machine control system 106.

During operation, speed sensor 104 interacts with teeth 114 that circumscribe a speed wheel 116 coupled to a rotatable member 118 of rotatable machine 100 to generate an output signal relating to a speed of rotation of rotatable member 118. In the exemplary embodiment, a variable reluctance sensing element 120 generates a substantially sinusoidal output, which is digitized by a digitization circuit 122 housed within the same housing as variable reluctance sensing element 120. In one embodiment, variable reluctance sensing element 120 includes a coil of wire at least partially surrounding a metallic or magnetic structure. Digitization circuit 122 receives power from external sensor power supply 110 to digitize and amplify the substantially sinusoidal output of variable reluctance sensing element 120. A digital output of variable reluctance sensing element 120 is transmitted to speed controller 112, where the digital signal is further processed for generating speed control commands and/or display and other desired uses.

Figure 2:
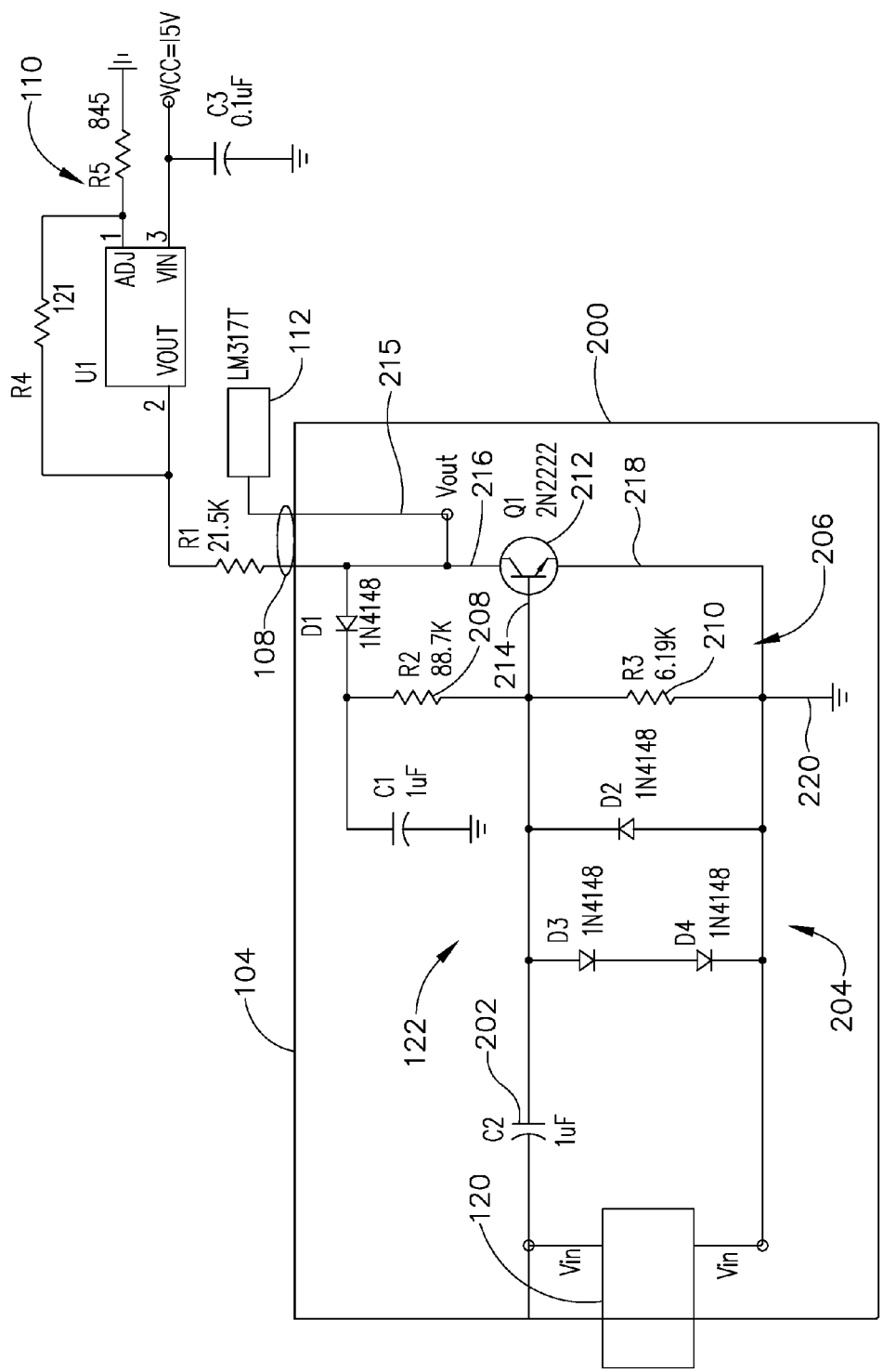

FIG. 2 is a schematic diagram of speed sensor 104 in accordance with an exemplary embodiment of the present invention. In the exemplary embodiment, speed sensor 104 includes variable reluctance sensing element 120 and digitization circuit 122 housed in a single housing 200. Housing 200 is locatable proximate a speed pick up point (not shown in FIG. 2) such as a gear or sprocket tooth, protuberance, or surface discontinuity. Typically, such locations comprise a hostile environment. Speed sensor 104 may be configured such that at least a portion of variable reluctance sensing element 120 extends external to housing 200. Digitization circuit 122 includes a blocking capacitor 202 and a full wave rectifier 204. Blocking capacitor 202 permits a sinusoidal signal to pass from variable reluctance sensing element 120 to digitization circuit 122, but blocks the DC bias voltage from digitization circuit 122 from reaching variable reluctance sensing element 120. A voltage divider 206 comprises a first resistive element 208 and a second resistive element 210. Digitization circuit 122 also includes an NPN switching transistor 212 in an open collector configuration. Power for digitization circuit 122 is provided by a regulated power supply located remotely from speed sensor 104 such that the regulated power supply does not encounter the hostile environment proximate speed sensor 104. A base 214 of transistor 212 is coupled to voltage divider 206 which sets a bias for the operation of transistor 212. An output of rectifier 204 is also coupled to base 214 to control the operation of transistor 212 relative to an input from variable reluctance sensing element 120. An output 215 of digitization circuit 122 is taken from a collector 216 of transistor 212. An emitter 218 of transistor 212 is coupled to ground 220.

During operation, when a voltage on base 214 is greater than the voltage on emitter 218, transistor 212 will conduct a current flow through transistor 212 from collector 216 to emitter 218. The voltage on base 214 is related to the output of variable reluctance sensing element 120 such that transistor 212 switches on and off as a function of the speed of for example, the rotation of a rotating target. The level of operation of transistor 212 is set by voltage divider 206 such that for a variable amplitude signal received from variable reluctance sensing element 120, transistor 212 outputs a substantially constant amplitude square-wave or digital signal at a frequency related to the frequency of the signal received from variable reluctance sensing element 120.

Accordingly, digitization circuit 122 is configured to receive an input signal from variable reluctance sensing element 120 relative to a speed of a component being measured and output output signal 215 for further processing. When measuring a relatively low speed, the input signal to digitization circuit 122 comprises a first input amplitude and the output signal comprises a first output amplitude. When measuring a relatively high speed the input signal comprises a second input amplitude and the output signal comprises a second output amplitude wherein the first and second input amplitudes are different and the first and second output amplitudes are approximately equal.

Figure 3:
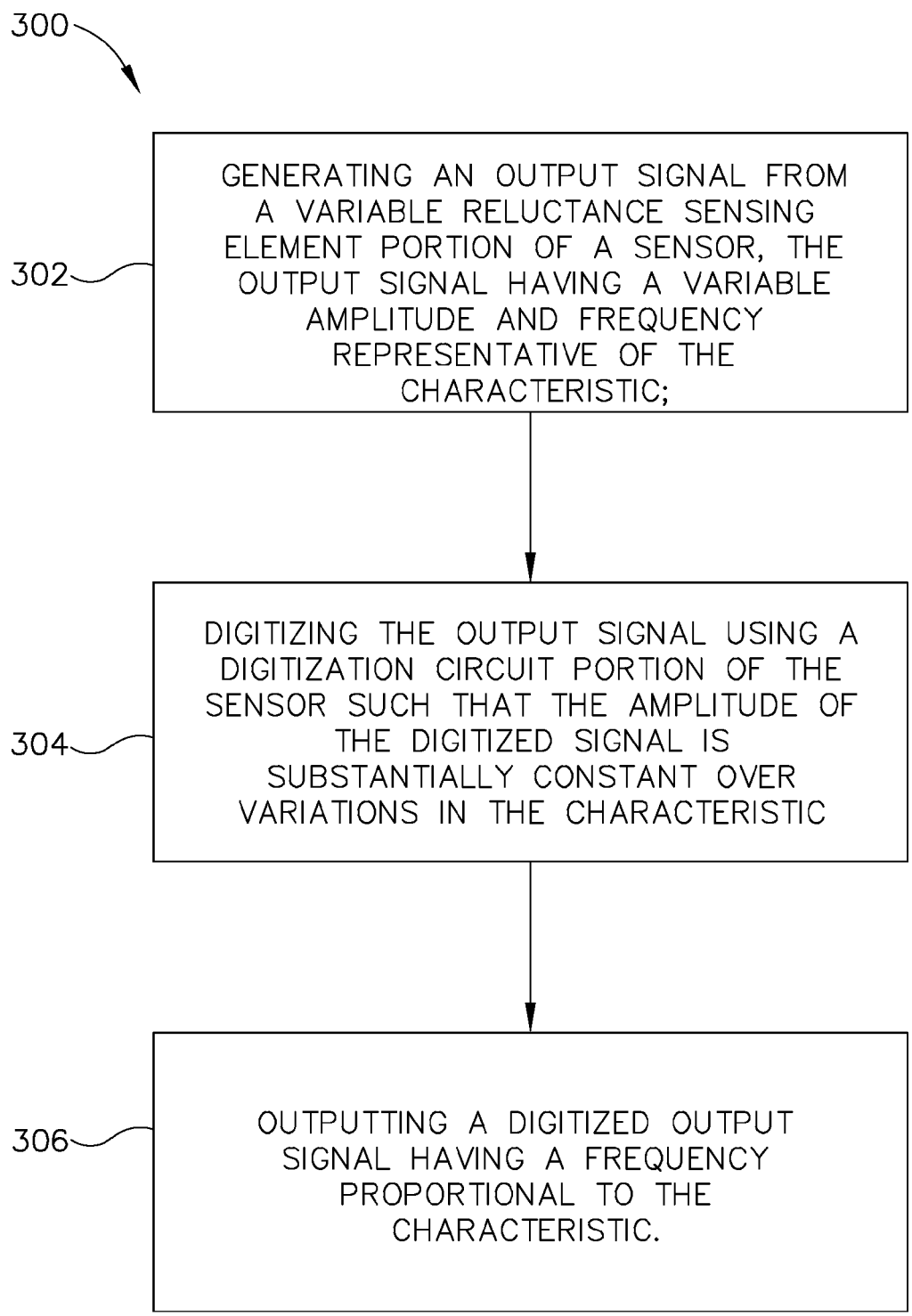

FIG. 3 is a flow diagram of a method 300 of measuring a characteristic of a machine in accordance with an exemplary embodiment of the present invention. In the exemplary embodiment, method 300 includes generating 302 an output signal from a variable reluctance sensing element portion of a sensor, the output signal having a variable amplitude and frequency representative of the characteristic. Method 300 also includes digitizing 304 the output signal using a digitization circuit portion of the sensor such that the amplitude of the digitized signal is substantially constant over variations in the characteristic, and outputting 306 a digitized output signal having a frequency proportional to the characteristic.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is performing a sinusoidal to square wave "digitization" and signal amplification within the variable reluctance speed sensor without requiring any more wires than are presently used in existing 2-wire implementations. The circuit provides a consistent output voltage regardless of engine speed and employs an externally powered "open collector" configuration, allowing the power source and measurement circuit to be contained within the engine controls. Implementation greatly reduces the amount of engine control circuitry because the signal output from the amplified speed sensor allows the control circuitry to process the sensor output as a digital signal. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and systems of digitizing the output signal of a sensing element using a digitization circuit portion of a sensor provides a cost-effective and reliable means for measuring a characteristic of a machine. More specifically, the method and system described herein facilitate a sensor that provides a consistent output voltage regardless of the variability of the measured characteristic. As a result, the method and system described herein facilitate operating machinery in a cost-effective and reliable manner.

While the disclosure has been described in terms of various specific embodiments, it will be recognized that the disclosure can be practiced with modification within the spirit and scope of the claims.

The invention claimed is:

1. A speed sensor comprising:
   a housing;
   a variable reluctance sensor (VRS) mounted at least partially within said housing; and
   a digitization circuit electrically coupled to an output of said VRS, said digitization circuit mounted within said housing, said digitization circuit configured to:
   receive an input signal from said VRS relative to a speed of a component being measured;
   convert a substantially sinusoidal output of said VRS into a digital output signal; and
   output a output signal for further processing, when measuring a relatively low speed the input signal comprises a first input amplitude and the output signal comprises a first output amplitude, when measuring a relatively high speed the input signal comprises a second input amplitude and the output signal comprises a second output amplitude wherein the first and second input amplitudes are different and the first and second output amplitudes are approximately equal.

2. A speed sensor in accordance with claim 1 wherein said digitization circuit receives power from external to said housing.

3. A speed sensor in accordance with claim 1 wherein said digitization circuit comprises an open collector transistor powered from a source external to said housing.

4. A speed sensor in accordance with claim 1 wherein said digitization circuit receives an input signal from said VRS comprising a first frequency and outputs a substantially square wave digital signal comprising a second frequency, the second frequency approximately equal to the first frequency.

5. A speed sensor in accordance with claim 1 wherein at least a portion of said variable reluctance sensor (VRS) extends external to said housing.

6. A speed sensor in accordance with claim 1 wherein said VRS comprises a coil of wire at least partially surrounding a metallic structure.

7. A speed sensor in accordance with claim 1 wherein said VRS comprises a coil of wire at least partially surrounding a magnetic structure.

8. A method of measuring a characteristic of a machine, said method comprising:
   generating an output signal from a variable reluctance sensing (VRS) element portion of a sensor, the VRS output signal having a variable amplitude and frequency representative of the characteristic;
   receiving by a digitization circuit portion of the sensor the VRS output signal relative to a speed of a component being measured;
   digitizing the VRS output signal using said digitization circuit portion of the sensor such that when measuring a relatively low speed the VRS output signal comprises a first VRS output signal amplitude and an output signal of the digitization circuit portion comprises a first digitization circuit portion output amplitude, when measuring a relatively high speed the VRS output signal comprises a second VRS output signal amplitude and the output signal of the digitization circuit portion comprises a second VRS output signal amplitude wherein the first and second VRS output signal amplitudes are different and the first and second amplitudes of the digitization circuit portion are approximately equal; and
   outputting a digitized output signal having a frequency proportional to the characteristic.

9. A method in accordance with claim 8 further comprising powering the digitization circuit portion from offboard the sensor.

10. A method in accordance with claim 8 further comprising a blocking a DC bias voltage from the digitization circuit from reaching the variable reluctance sensing element and permitting a sinusoidal signal to pass from the variable reluctance sensing element to the digitization circuit.

11. A method in accordance with claim 8 further comprising rectifying the output signal.

12. A method in accordance with claim 8 wherein digitizing the output signal comprises switching an open collector transistor.

13. A method in accordance with claim 8 further comprising transmitting the digitized signal through a two-wire connection to a speed control system.

14. A speed control system comprising:
   a speed sensor including a variable reluctance sensing element electrically coupled to an externally powered digitization circuit, said variable reluctance sensing element and said digitization circuit located in a single housing, said digitization circuit configured to receive an input signal from said variable reluctance sensing element relative to a speed of a component being measured and output a output signal for further processing, when measuring a relatively low speed the input signal comprises a first input amplitude and the output signal comprises a first output amplitude, when measuring a relatively high speed the input signal comprises a second input amplitude and the output signal comprises a second output amplitude wherein the first and second input amplitudes are different and the first and second output amplitudes are approximately equal;
   a power supply positioned remotely from said speed sensor and electrically coupled to said speed sensor through a two-wire connection, said power supply configured to supply a regulated voltage to the digitization circuit; and
   a controller configured to receive a digital output of the speed sensor and to generate speed control commands using the received digital output.

15. A system in accordance with claim 14 wherein said variable reluctance sensing element and said digitization circuit are housed within a single enclosure.

16. A system in accordance with claim 14 wherein said digitization circuit is configured to convert a substantially sinusoidal output of said VRS into a digital output signal.

17. A system in accordance with claim 14 wherein said digitization circuit comprises an open collector transistor powered from a source external to said housing.

18. A system in accordance with claim 14 wherein at least a portion of said variable reluctance sensing element extends external to said housing.

* * * * *